United States Patent [19]
Horikoshi et al.

[11] Patent Number: 5,374,181
[45] Date of Patent: Dec. 20, 1994

[54] INJECTION MOLDING NOZZLE DEVICE

[75] Inventors: Maki Horikoshi, Kawasaki; Hiroyuki Matsumoto, Tama; Teppei Yamaji, Nobeoka; Mitsuo Watanabe, Ora, all of Japan

[73] Assignee: Asahi Kasei Kogyo Kabushiki Kaisha, Japan

[21] Appl. No.: 239,852

[22] PCT Filed: Aug. 1, 1991

[86] PCT No.: PCT/JP91/01032

§ 371 Date: May 22, 1992

§ 102(e) Date: May 22, 1992

[87] PCT Pub. No.: WO92/02349

PCT Pub. Date: Feb. 20, 1992

Related U.S. Application Data

[63] Continuation of Ser. No. 844,565, May 22, 1992, abandoned.

[30] Foreign Application Priority Data

Aug. 3, 1990 [JP] Japan ................... 2-205096

[51] Int. Cl.⁵ .............. B29C 45/20; B29C 45/34
[52] U.S. Cl. ................. 425/546; 425/564; 425/566; 425/812; 425/DIG. 224
[58] Field of Search ............... 425/533, 546, 564, 566, 425/812, DIG. 102, DIG. 224

[56] References Cited

U.S. PATENT DOCUMENTS

| | | | |
|---|---|---|---|
| 2,940,123 | 6/1960 | Beck et al. | 425/170 |
| 3,947,177 | 3/1976 | Eckardt | 425/567 X |
| 4,106,887 | 8/1978 | Yasuike et al. | 425/566 X |
| 4,942,006 | 7/1990 | Loren | 425/546 X |
| 4,944,910 | 7/1990 | Hendry | 425/812 X |
| 5,022,846 | 6/1991 | Schmidt | 425/564 |

FOREIGN PATENT DOCUMENTS

| | | |
|---|---|---|
| 0321160 | 6/1989 | European Pat. Off. |
| 0449452A2 | 10/1991 | European Pat. Off. |
| 2716817 | 8/1978 | Germany |
| 51-119063 | 10/1976 | Japan |
| 59-49902 | 12/1984 | Japan |
| 64-30723 | 2/1989 | Japan |

OTHER PUBLICATIONS

No. JP4089220, Publication Date Mar. 23, 1992.
Patent Abstracts of Japan, vol. 016, No. 314 (M-1278), Jul. 9, 1992.

*Primary Examiner*—Richard L. Chiesa
*Attorney, Agent, or Firm*—Finnegan, Henderson, Farabow, Garrett & Dunner

[57] ABSTRACT

This invention concerns an injection molding nozzle device (25) provided with an operating valve (31) installed movably in the axial direction inside a nozzle body (4) possessed of a resin passage (12) and enclosing therewith a fluid passage (10) incorporating therein a check valve (11). This injection molding nozzle device is furnished with a fluid discharge open-shut device capable of opening or shutting a fluid discharge passage (17) formed separately of the fluid passage (10) or the check valve (11) of the fluid passage (10).

3 Claims, 7 Drawing Sheets

INJECTION MOLDING NOZZLE DEVICE

This application is a continuation of application Ser. No. 07/844,565 filed May 22, 1992, now abandoned.

FIELD OF THE INVENTION

This invention relates to an injection molding nozzle device for use in injection molding of synthetic resin. More particularly, this invention relates to an injection molding nozzle device to be used in molding a shaped article containing a cavity formed by dint of a fluid, such as a gas, by injecting molten synthetic resin and the fluid into the mold cavity of a mold.

DESCRIPTION OF THE PRIOR ART

Among conventional injection molding nozzle devices of the class adapted to injecting molten synthetic resin and a fluid into the mold cavity of a mold, one known version comprises a nozzle body with a needle valve reciprocated by the force of an external drive mechanism to open and shut a resin passage. Provided in the central part of this needle valve is a fluid passage fitted with a check valve [Japanese Patent Application Disclosure (KOKAI) No. 119,063/1976]. In this injection molding nozzle device, when the needle valve is advanced, the leading terminal of the needle valve is pressed against the periphery of an opening of the front part of the nozzle body which communicates with the resin passage, consequently shutting off the resin passage. The needle valve is provided at the front part thereof with a needle valve opening which communicates with the fluid passage. While the resin passage is kept in its shut state, the fluid can be injected via the needle valve opening and the nozzle body opening into the mold cavity. Conversely, when the needle valve is retracted, the tight contact is terminated between the periphery of the nozzle body opening and the front part of the needle valve and the nozzle body opening is opened into the resin passage. In this manner, the molten synthetic resin will be injected via the nozzle body opening into the mold cavity.

In this conventional injection molding nozzle device, however, once the fluid is injected into the mold cavity, it no longer can be recovered or discharged through the fluid passage because the fluid passage is provided with a check valve adapted to prevent the molten synthetic resin from flowing back into the fluid passage during injection of the molten synthetic resin into the mold cavity. The discharge of the fluid so injected into the mold cavity, therefore, is attained by separating the mold and the nozzle body from each other and consequently allowing direct release of the fluid from the mold. This procedure, however, not only makes fluid recovery and reuse difficult but also can cause some defects in the shaped article because the pressure of the fluid inside the mold cavity cannot be controlled, for example, by gradually lowering.

The problem will be described in more detail below.

Generally, the pressure of the fluid which is injected into the mold cavity is required; (a) to overcome that of the molten synthetic resin at the injection inlet, (b) to be capable of causing flow of the molten synthetic resin to be expelled to the gate and the mold cavity when the fluid is injected into the sprue and the runner and used therein in forming a hollow part, (c) to pass through the gate part, and (d) to enable flow inside the mold cavity of the molten synthetic resin when the fluid forms a hollow part inside the mold cavity. The magnitude of this pressure is fixed by such factors as the viscosity of the molten synthetic resin, the design of the mold, and the amount of the molten synthetic resin needed to fill the mold cavity.

After a hollow part has been formed or after the molten synthetic resin admitted into the mold cavity has been cooled to the extent of failing below the flowing temperature and undergoing solidification, the fluid injected into the central part of the molten synthetic resin in the mold cavity, presses the resin layer enveloping the hollow part and prevents a sink mark. If the pressure of the fluid is unduly high, it produces residual strain in the resin layer enveloping the hollow part. Particularly, this residual strain occurs concentrically in the boundary surface between the hollow part and the solid part when the hollow part is formed selectively at a specific position of the mold cavity.

When an unduly high pressure is exerted on the resin layer enclosing the hollow part and residual strain is inflicted on the resin layer, the produced shaped article sustains the following defects in quality, depending on the characteristic properties of the resin to be used.

a. Micro-crazing or blushing occurs in the surface defining the hollow part. Otherwise, crazing is caused by aging owing to gradual alleviation of stress following the molding.

b. Inflation occurs in the resin layer enveloping the hollow part.

Further when the fluid of unduly high pressure is retained in the hollow part of the mold cavity, the molding cycle is elongated and the productivity of the molding apparatus is jeopardized because much time is required for the pressure of the fluid in the hollow part to decrease to the atmospheric pressure before the shaped article is ready to be removed from the mold.

An injection molding nozzle device which enables the fluid injected into the mold cavity to be recovered or discharged via the fluid passage has been proposed in Japanese Patent Application Disclosure (KOKAI) No. 30,723/1989. This injection molding nozzle device will be described specifically hereinbelow.

Similar to the conventional injection molding nozzle device described above, this injection molding nozzle device is provided in a nozzle body with a needle valve reciprocated by the force of an external drive mechanism and consequently enabled to open and shut a resin passage and, further, a fluid passage is provided in the central part of the needle valve. To the rear part of the needle valve, an actuator bar is connected perpendicular to the direction of the needle valve. A fluid passage is formed inside the actuator bar. To this fluid passage is connected the fluid passage in the needle valve.

The fluid passage inside the actuator bar is provided with a supply side check valve and a discharge side check valve which are opposed to each other across the connecting part for joining this fluid passage to the fluid passage in the aforementioned needle valve. The supply side check valve is connected to the fluid source and the discharge side check valve is also connected to the fluid source. The supply side check valve is opened by dint of the pressure from the fluid source side and shut by the pressure from the needle valve side. The discharge side check valve is pressed by a spring disposed on the fluid source side. When the pressure on the needle valve side is increased above a fixed level by adjustment of the repelling force of the spring, the discharge side check valve is opened to allow flow of the fluid from the needle valve side to the fluid source side.

In the case of the injection molding nozzle device described above, when the fluid is supplied from the fluid source to initiate injection of the fluid into the mold cavity, the supply side check valve is opened by the pressure of the fluid from the fluid source side so as to permit passage therethrough of the fluid and consequent injection of the fluid into the mold cavity. In contrast, the discharge side check valve is exposed to the repelling force of the spring disposed on the fluid source side and to the pressure of the fluid from the fluid source, whereas the needle valve side is exposed to the pressure of the fluid advanced through the aforementioned supply side check valve. The discharge side check valve remains in its shut state because the pressure on the fluid source side and that on the needle valve side are substantially equal. The fluid can be recovered or discharged from the mold cavity by stopping the supply of the fluid from the fluid source. This is because the stop of the supply of the fluid from the fluid source causes the supply side check valve to be pressed into a shut state by the pressure of the fluid tending to flow backward from the mold cavity. In the meantime, the discharge side check valve is caused, by the pressure of the fluid tending to flow backwardly from the mold cavity, to increase the needle valve side pressure thereof above the repelling force of the spring disposed on the fluid source side. When the difference between these forces exceeds a stated level, the discharge side check valve is opened and consequently made to permit backflow of the fluid from the mold cavity.

In the case of the injection molding nozzle device described above, however, the distance from the front part of the needle valve to the check valve is long and the fluid passage to be formed therebetween is inevitably compelled to assume a curved and complicated shape. Thus, the fluid passage has a disadvantage that the synthetic resin or the debris thereof will flow backwardly and clog the passage. To ensure infallible operation of the discharge side check valve, the difference of pressure for opening the check valve, namely difference between the pressure of the fluid on the needle valve side and the repelling force of the fluid source side spring, must be amply large. Owing to the restriction arising from this pressure difference, the amount of control over the pressure of the fluid inside the mold cavity is limited.

BRIEF DESCRIPTION OF THE DRAWINGS

This invention has been conceived by the urge to overcome the problem inherent in the conventional injection molding nozzle devices described above. It is aimed at enabling the fluid injected into the mold cavity to be recovered or discharged via a fluid passage so constructed as to prevent backflow or clogging of synthetic resin or debris and, at the same time, enabling the pressure of the fluid inside the mold cavity to be controlled with ample freedom.

The object described above is accomplished by providing the passage for discharge of the fluid injected into the molten synthetic resin in the mold cavity with means for freely opening or shutting the passage.

To be specific, this invention is directed to an injection molding nozzle device comprising a resin passage from an opening of a nozzle body at the front part of the nozzle body and to an injection cylinder, an operating valve disposed inside the nozzle body and adapted to be reciprocated in the axial direction and provided with an operating valve opening at a position approximately coinciding with the nozzle body opening, a fluid passage laid inside the operating valve and adapted to communicate with the nozzle body opening via a check valve, and a fluid discharge open—shut means adapted to be opened to permit discharge of the fluid.

Since the injection molding nozzle device of this invention is provided with the fluid discharge open—shut means, it allows the fluid passage to be constructed simply without requiring it to be particularly bent. This enables the injection of molten resin, the injection of a fluid, and the discharge or recovery of the fluid from the hollow part of the mold cavity to be freely effected severally with stated timing, ensures production of an excellent shaped article and, at the same time, permits efficient recovery for reuse of the fluid.

DESCRIPTION OF THE PREFERRED EMBODIMENTS

Now, the present invention will be described specifically hereinbelow with reference to examples.

EXAMPLE 1

Figure 1:
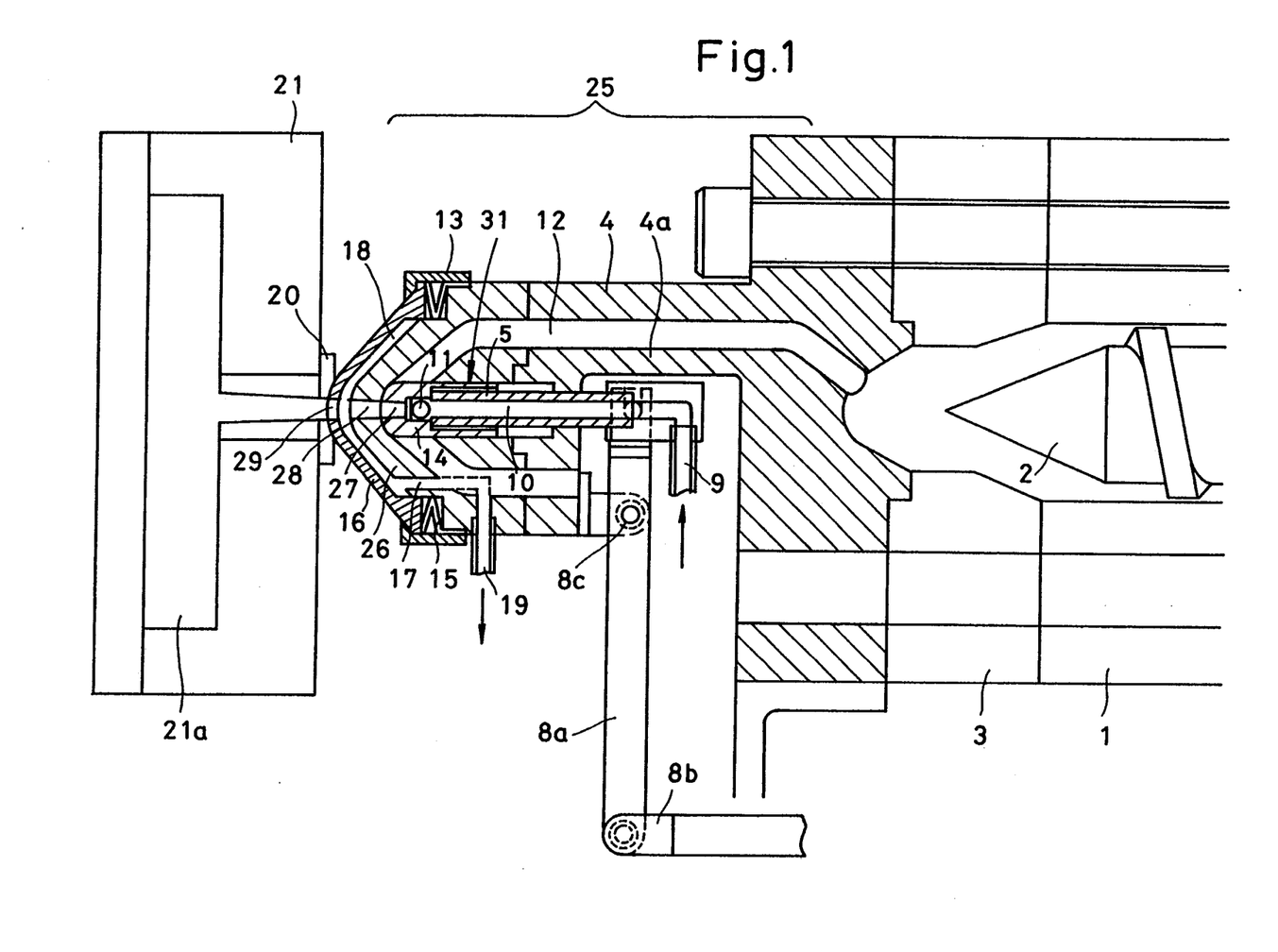
FIG. 1 is a cross section illustrating the first example of the injection molding nozzle device according to the present invention.

FIG. 1 represents one example of the injection molding nozzle device of this invention. An injection cylinder 1 houses a screw 2 therein. To the discharge side of the injection cylinder 1, an adapter 3 for connection of an injection molding nozzle device 25 is connected and this injection molding nozzle device 25 is further connected via the adapter 3. The injection molding nozzle device 25 comprises a nozzle body 4, a nozzle body front part 26, a head part 16, a supporting member 4a, and all the component parts attached to the peripheries and interiors thereof. A nozzle body opening 28 is formed in the central part of the front part of the nozzle body front part 26. This nozzle body opening 28 is disposed at the position approximately coinciding with a head part opening 29 formed at the front part of the head part 16 where the nozzle body front part 26 comes into engagement with the head part 16.

The head part 16 is a front wall part constituting a front part of the injection molding nozzle device 25 mentioned above. It is provided with the head part opening 29 at the position corresponding to an injection inlet of a mold 21, connected to the nozzle body front part 26 through the medium of a compressed spring 15, and adapted to be moved in the axial direction in the peripheral part of the nozzle body front part 26. The spring 15 has the function of pushing the head part 16 in the direction of a sprue bush 20 of the mold 21. A head part supporting component 13 is intended to prevent the head part 16 from falling off the nozzle body front part 26 and is incapable of obstructing the motion of the head part 16 due to the compression of the spring 15. Though the motion of the head part 16 is attained by the pressure of the compressed spring in the present example, the head part 16 may be otherwise adapted to be driven by dint of an external drive mechanism such as a piston cylinder disposed outside the injection molding nozzle device 25, for example.

An operating valve 31 which comprises an operating valve supporting member 5 and an operating valve front part 14 is provided with an operating valve opening 27. It is slidably inserted into the nozzle body 4 and the nozzle body front part 26, and adapted to be moved in the axial direction of the injection molding nozzle device 25 by a driving source (not shown), connected to levers 8a and 8b which pivot about a fulcrum 8c formed on the lever 8a.

A resin passage 12 extends past the gap between the nozzle body front part 26 and the operating valve 31, through the nozzle body opening 28 and the head part opening 29, and to the injection inlet of the mold 21.

The resin passage 12 is shut by the advance of the operating valve 31 in the direction of the mold 21, since the pressing surface of the operating valve front part 14 is pressed against the central part of the inner wall of the nozzle body front part 26. The communication between the resin passable 12 and the injection inlet of the mold 21 is therefor broken by the operating valve front part 14. The retraction of the operating valve 31 establishes the communication and opens the resin passage 12.

A fluid passable 10 inside the operating valve 31 communicates with the injection inlet of the mold 21 via a check valve 11 and further with a compressed fluid flow path 9 which leads to an fluid source (not shown).

The check valve 11 opens or shuts the fluid passage 10 when a pressure difference occurs in the fluid between the injection inlet of the mold 21 and the fluid passage 10. To be specific, the fluid passage 10 is opened toward the injection inlet side of the mold 21 when the pressure of the fluid in the fluid passage 10 is higher than that of the fluid on the injection inlet side of the mold 21 or the pressure of the molten resin. Otherwise, the fluid passage 10 is shut to break the communication between the fluid passage 10 and the injection inlet of the mold 21.

A fluid discharge passage 17 is formed inside the nozzle body front part 26 and is adapted to communicate with a low pressure fluid flow path 19 which leads to a low pressure fluid source (not shown). The fluid discharge passage 17 is opened or shut with a fluid discharge open—shut means which is composed of the head part 16 and the nozzle body 4. Specifically, it is shut by the fact that the inner wall of the head part 16 is brought into pressed contact with the outer wall of the nozzle body front part 26. The breakage of this pressed contact allows the fluid discharge passage 17 to communicate with the head part opening 29 via the gap between the head part 16 and the nozzle body front part 26.

This example has the fluid discharge passage 17 formed inside the nozzle body front part 26. Otherwise, this fluid discharge passage 17 may be opened into the head part 16 on the outer side of the surface of pressed contact between the head part 16 and the nozzle body 4 and then allowed to communicate with the low pressure fluid source. It is also permissible for the fluid discharge passage 17 to communicate with the rear part of the check valve 11 inside the injection molding nozzle device 25.

Now, the actual operations of the operating valve 31 and the head part 16 in injection molding of a hollow shaped article, and the positional relation of the components in the injection molding nozzle device 25 will be described hereinbelow with reference to FIGS. 2A, 2B and 2C.

Figure 2A:
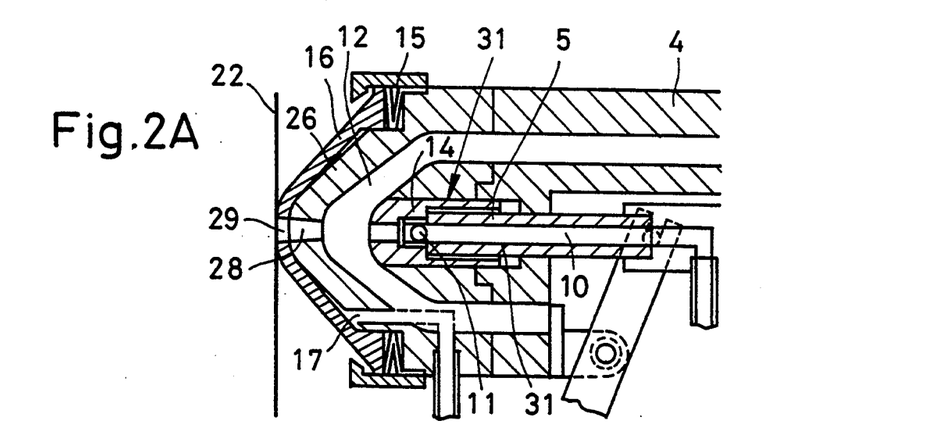
FIGS. 2A to 2C are explanatory diagrams illustrating sequentially the operation of the head part and the operating valve of the first example.

(A) Step of Injection of Molten Synthetic Resin (FIG. 2A)

The positional relation between the operating valve 31 composed of the operating valve supporting member 5 and the operating valve front part 14 on the one hand and the head part 16, the nozzle body 4, and the nozzle body front part 26 on the other hand is shown in FIG. 2A. A line 22 represents a surface of pressed contact between the sprue bush 20 of the mold 21 (not shown) and the head part 16. When the injection cylinder 1 (shown in FIG. 1) advances in the direction of the mold 21 (shown in FIG. 1), the nozzle body 4 which is connected to the injection cylinder 1 simultaneously advances, the head part 16 comes into pressed contact at the surface of pressed contact 22 with the sprue bush 20 (shown in FIG. 1) of the mold 21. The nozzle body 4 advances in spite of the compressing pressure of the compressing spring 15 and, the surface of pressed contact of the nozzle body front part 26 comes into pressed contact with the central part of the inner wall of the head part 16. The nozzle body opening 28 disposed in the nozzle body front part 26 coincides with the head part opening 29 of the head part 16, and communicates with the injection inlet of the mold 21. At this time, the fluid discharge passage 17 is cut off from the injection inlet of the mold 21 by the surface of pressed contact between the nozzle body front part 26 and the central part of the inner wall of the head part 16.

In the meantime, the operating valve 31 is moved by the drive source (not shown) away from the mold on the axial line of the nozzle body 4 to open the resin passage 12 and set it communicating with the injection inlet of the mold 21.

In consequence of the advance of the screw 2 (FIG. 1) of the injection cylinder 1, the mold 21 is filled with the molten synthetic resin. In this case, when the pressure of the molten synthetic resin in the resin passage 12 is increased by the pressure utilized for the packing, the cheek valve 11 shuts off the communication between the resin passage 12 and the fluid passage 10 and prevents leakage of the molten synthetic resin into the fluid passage 10.

Figure 2B:
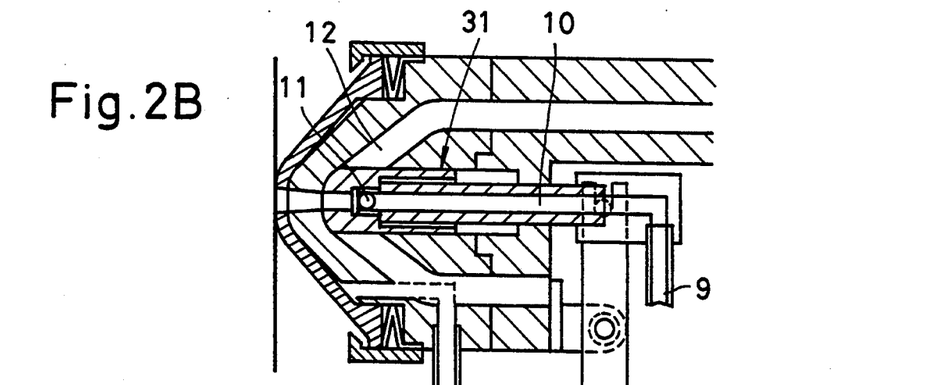

(B) Step of Injection of Compressed Fluid (FIG. 2B)

Now, the process in which the advance of the operating valve 31 in the direction of the mold 21 brings the surface of pressed contact at the front part of the operating valve 31 into pressed contact with the central part of the inner wall of the nozzle body 4 induces injection of the compressed fluid into the mold 21. To be specific, FIG. 2B depicts the configuration in which the communication between the resin passage 12 and the injection inlet of the mold 21 is shut off by the pressed contact of the front part of the operating valve 31 with the central part of the inner wall of the nozzle body 4.

In this state, the compressed fluid from the external compressed fluid source (not shown) is passed through the compressed fluid passage 9 and the fluid passage 10 and injected into the molten synthetic resin held in the mold 21. In this case, the pressure of the compressed fluid is higher than that of the molten synthetic resin in the mold 21 and, as a result, the check valve 11 is opened in the direction of the injection inlet of the mold 21.

During the transition of the state shown in FIG. 2A to that shown in FIG. 2B, the operating valve 31 is advanced in the direction of the mold and the advance of the operating valve 31 is stopped before the front part of the operating valve 31 comes into pressed contact with the central part of the inner wall of the nozzle body 4. Then the communication between the resin passage 12 and the injection inlet of the mold 21 is held. The pressure used for filling the mold with the molten resin relative to the pressure of the compressed fluid can be adjusted and the resin and the compressed fluid can be simultaneously injected into the mold to full capacity.

Though the magnitude of the pressure used for filling the mold 21 with the molten synthetic resin is variable with the wall thickness of the shaped article to be produced and the projected surface area of this shaped article, it is generally in the range of from 200 to 800 kg/cm$^2$. The pressure may be below the lower limit of this range when the wall thickness of the shaped article is large and the projected surface area is small. Pressure exceeding the upper limit of the range is required when the wall thickness is small and the projected surface area is large. During the process step shown in FIG. 2B, namely during the process in which the mold 21 has been filled to full capacity with the molten synthetic resin and the operating valve 31 is approaching the point of pressed contact with the central part of the inner wall of the nozzle body 4, the molten synthetic resin in the mold 21 (not shown) is relieved of pressure. Consequently, swelling and leakage through the injection inlet of the mold 21 and back flow through the head part 16 and the nozzle body openings 29, 28 into the resin passage 12 is allowed. The amount of the resin thus allowed to flow back increases in proportion to the magnitude of the pressure used for filling the mold 21 with the molten synthetic resin and approaches the upper limit of the range mentioned above. But the check valve 11 provided for the operating valve 31 keeps the resin from leaking into the fluid passage 10.

Figure 2C:
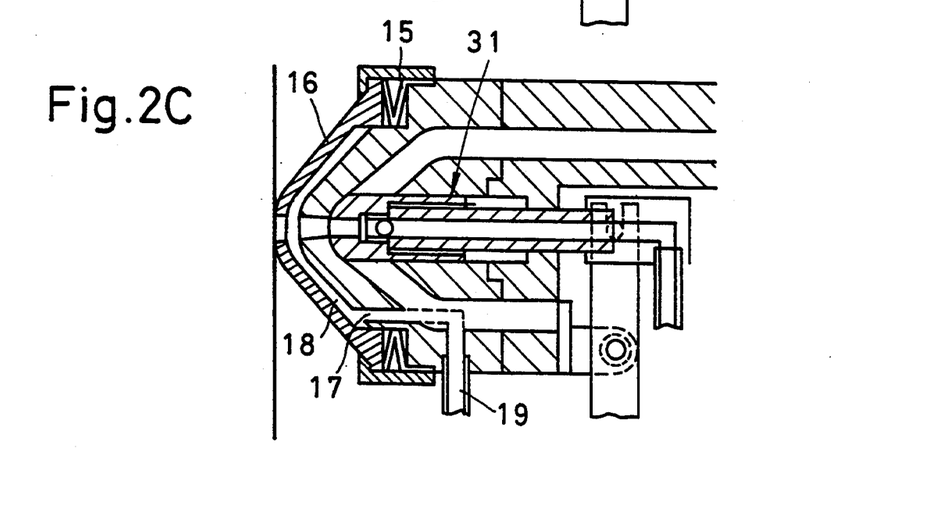

(C) Step of Discharging Compressed Fluid (FIG. 2C)

Now, the state of the device illustrated in FIG. 2C will be described below. After the injection of the compressed fluid into the molten synthetic resin held inside the mold 21 is completed in the step of FIG. 2B, a gap 18 is produced between the outer wall of the nozzle body 4 and the inner wall of the head part 16. The injection inlet of the mold 21 is consequently allowed to communicate with the fluid discharge passage 17 via the gap 18 by keeping the front part of the operating valve 31 in pressed contact with the central part of the inner wall of the nozzle body 4. This causes the nozzle body 4 to retract to an extent short of disrupting the pressure exerted by the compressed spring 15 of the head part 16 upon the surface of pressed contact 22 of the sprue bush of the mold 21. At this time, the compressed fluid which has been injected into the molten synthetic resin held inside the mold 21 can be recovered for reuse into the low pressure fluid source (not shown) through the injection inlet of the mold 21 and then via the gap 18 and the fluid discharge passage 17. During the discharge of the compressed fluid, the outer wall of the nozzle body 4 may be brought into pressed contact with the inner wall of the head part 16 so as to keep the enclosed interior under a decreased pressure.

The injection molding nozzle device 25 of the present first example decreases the resistance of pressure offered to the compressed fluid and shortens the time required for the recovery of the compressed fluid because the fluid passage 10, serving to inject the compressed fluid into the mold 21, is different from the fluid discharge passage 17 serving to return the compressed fluid from the mold 21, and further because the distance of the fluid discharge passage 17 is relatively short.

EXAMPLE 2

Instead of the head part 16 which intervenes in the engagement of the front part of the nozzle body 4 and the injection inlet of the mold as illustrated in FIG. 1, the head part 16 is devised so that the front part of the nozzle body 4 is directly brought into pressed engagement with the injection inlet of the mold 21 to accomplish the same function.

The detail of this head part 16 will be described hereinbelow with reference to FIG. 3.

Figure 3:
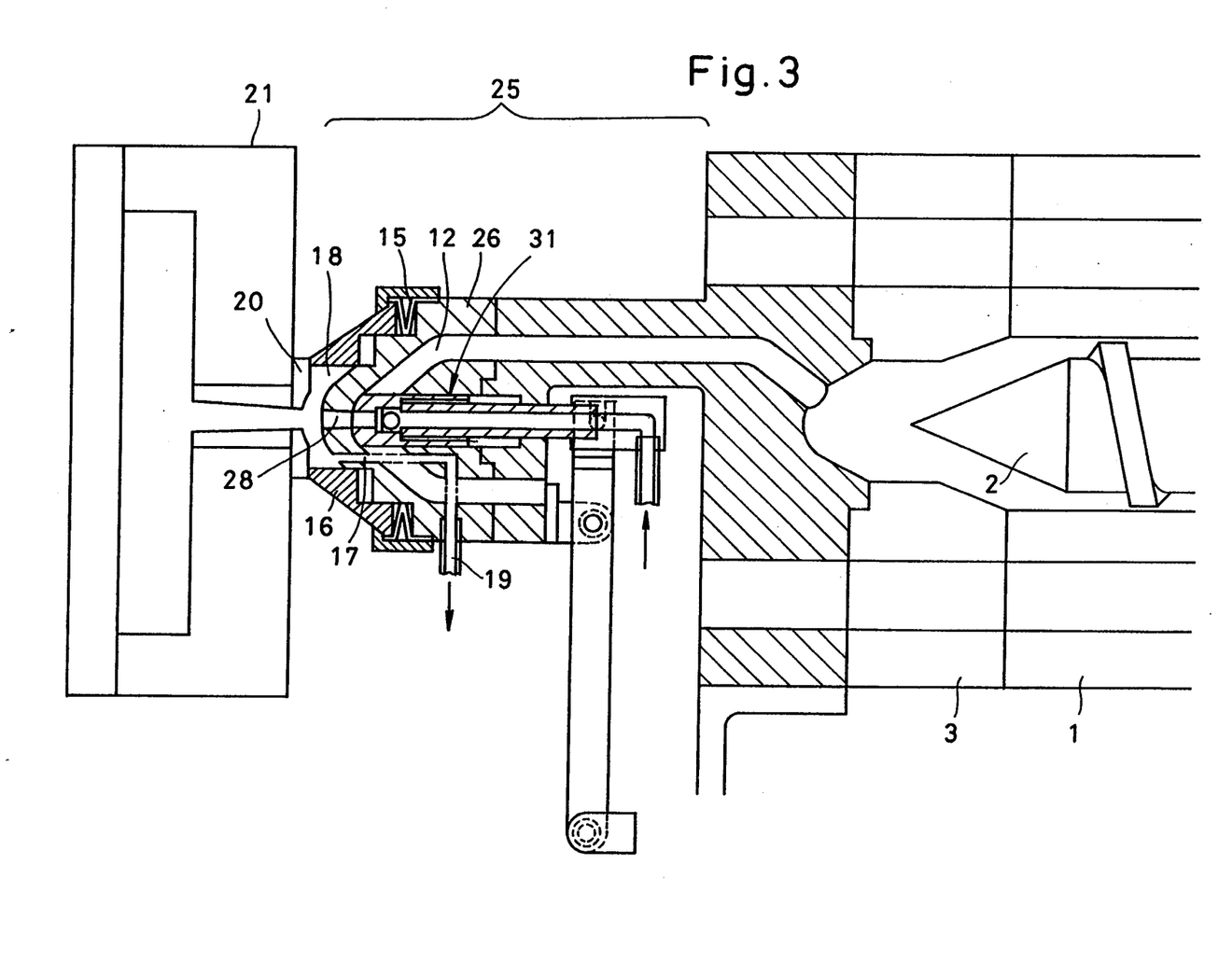
FIG. 3 is a cross section illustrating the second example.

The shapes and functions of all the component parts of the nozzle device are identical to those of the nozzle device of FIG. 1, except the shape of the head part 16 differs as illustrated in FIG. 3 from the shape of the head part of the nozzle device illustrated in FIG. 1.

When the injection cylinder 1 advances in the direction of the mold 21, the nozzle body front part 26 connected to the injection cylinder 1 simultaneously advances and the head part 16 comes into pressed contact with the surface falling concentrically outside the injection inlet of the sprue bush 20 of the mold 21. When the nozzle body front part 26 advances in spite of the resilient force of the spring 15, the surface of pressed contact at the nozzle body front part 26 comes into pressed contact with the injection inlet of the mold 21. At this time, the communication between the fluid discharge passage 17 and the injection inlet of the mold 21 is shut off by the pressed contact between the nozzle body front part 26 and the sprue bush 20 of the mold 21. The filling of the mold 21 with the molten synthetic resin and the injection of the compressed fluid therein are executed by manipulating the operating valve 31 as illustrated in FIGS. 2A and 2B.

When the injection cylinder 1 is retracted to an extent short of keeping the pressure exerted by the compressed spring 15 upon the sprue bush 20 of the mold 21 after the filling of the mold 21 with the molten synthetic resin and the injection of the compressed fluid therein, the nozzle body front part 26 is simultaneously retracted to give rise to the gap 18 enclosed by the outer wall of the nozzle body front part 26, the sprue bush 20 of the mold 21, and part of the inner wall of the head part 16. Then the injection inlet of the mold 21 communicates with the fluid discharge passage 17 via the gap 18.

In consequence of the procedure just described, the compressed fluid which has been injected into the molten synthetic resin held in the mold 21 is discharged out of the injection inlet of the mold 21, passed through the gap 18 and the fluid discharge passage 17, and recovered into the low pressure fluid source (not shown) via the low pressure fluid passage 19.

Even when the head part 16 is different in shape as described above, the injection molding nozzle device 25 using this head part 16 can fulfill the same function as that which uses the head part 16 of FIG. 1. Further, the present example enjoys the advantage that the gap 18 can be easily cleaned without removing the head part 16 because the head part has a large opening.

In the first and second examples, the head part 16 is adapted to go into pressed contact with the sprue bush 20 of the mold 21. Optionally, the head part 16 may be adapted so as to go into pressed contact with part of the mold 21 instead of with the sprue bush 20. The injection molding nozzle device using this head part 16 fulfills the same function as the first and second examples.

EXAMPLE 3

The third example of this invention will be described herein below with reference to FIG. 4.

The injection molding nozzle device 25 of this example is composed of the nozzle body 4 furnished with the nozzle body front part 26 and a valve element.

The nozzle body 4 is attached to the injection cylinder 1 and adapted to admit the molten synthetic resin in the injection cylinder 1 through the rear part of the resin passage 12. The nozzle body front part 26 is pressed against the mold 21 to connect the resin passage 12 through the nozzle body opening 28 to the mold cavity 21a via the sprue bush 20 of the mold 21. The resin passage 12 is interposed between the central part (the sliding part of the operating valve 31) and the periphery of the nozzle body 4. The valve element is enclosed with the nozzle body 4 and is composed of the operating valve 31 enclosed slidably in the axial direction with the nozzle body 4, a needle valve 32 enclosed slidably in the axial direction with the operating valve 31, the fluid passage 10 opened via the check valve 11 into the front part of the interior of the operating valve 31, and the liquid discharge passage 17 interconnecting the nozzle body opening 28 of the nozzle body front part 26 and the rear part of the check valve 11. In this construction, the operating valve 31 and the needle valve 32 are advanced or retracted to open or shut the resin passage 12 or the fluid passage 10 and the fluid discharge passage 17.

The front part of the resin passage 12 is shut when the operating valve 31 advances and the front outer wall of the operating valve 31 pushes the inner wall of the nozzle body front part 26. The front part of the resin passage 12 is opened when the operating valve 31 retracts and relieves the pressed contact mentioned above.

The fluid passage 10 inside the operating valve 31 opens in the forward direction and establishes communication between the compressed fluid passage 9 leading to the fluid source (not shown) and a needle valve opening 33 through the check valve 11 which assumes a shut state when pressed in the rearward direction. In consequence of the advance of the operating valve 31 and the needle valve 32, the fluid passage 10 is connected to the cavity 21a of the mold 21 through the operating valve opening 27 and the nozzle body opening 28. The check valve 11 may be provided with a spring adapted to push a backflow preventing ball rearwardly.

The fluid discharge passage 17 is a groove or an annular groove formed between the inner wall of the central part of the operating valve 31 and the periphery of the needle valve 32. It is connected to the fluid passage 10 via a connecting path 17a in the rear part of the check valve 11 and consequently enabled to recover the compressed fluid.

The fluid discharge passage 17 is shut when the needle valve 32, which is a means for opening or shutting the fluid discharge passage, advances and presses the inner wall of the operating valve 31 into pressed contact with the front outer wall of the needle valve 32. It is opened when the needle valve 32 retracts and relieves the aforementioned pressed contact.

Optionally, the fluid discharge passage 17 may be formed inside the needle valve 32 on the condition that it should be positioned so as to be shut by the inner wall of the operating valve 31.

The operating valve 31 and the needle valve 32 are respectively provided with lever receiving grooves 6c, 7c allowing insertion therein of levers 6a and 7a which are subjected to the forces of external drive mechanisms at the positions corresponding to the spider opening part of the nozzle body 4. They are independently advanced or retracted about fulcra 6d, 7d of the levers 6a, 7a by dint of the forces of the external drive mechanisms. The external drive mechanisms may be well-known hydraulic or pneumatic actuators (not shown). The forces of these external drive mechanisms are transmitted to the levers 6a, 7a respectively through the medium of connecting rods 6b, 7b and connecting pins 6e, 7e.

Figure 5A:
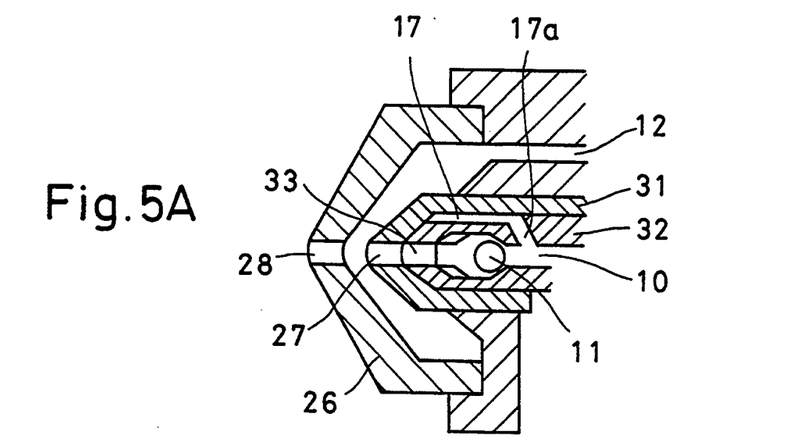
FIGS. 5A to 5C are explanatory diagrams illustrating sequentially the operation of the operating valve and the needle valve thereof.

Now, the operation of the present injection molding nozzle device 25 will be described hereinbelow with reference to FIG. 5A~5C.

Figure 4:
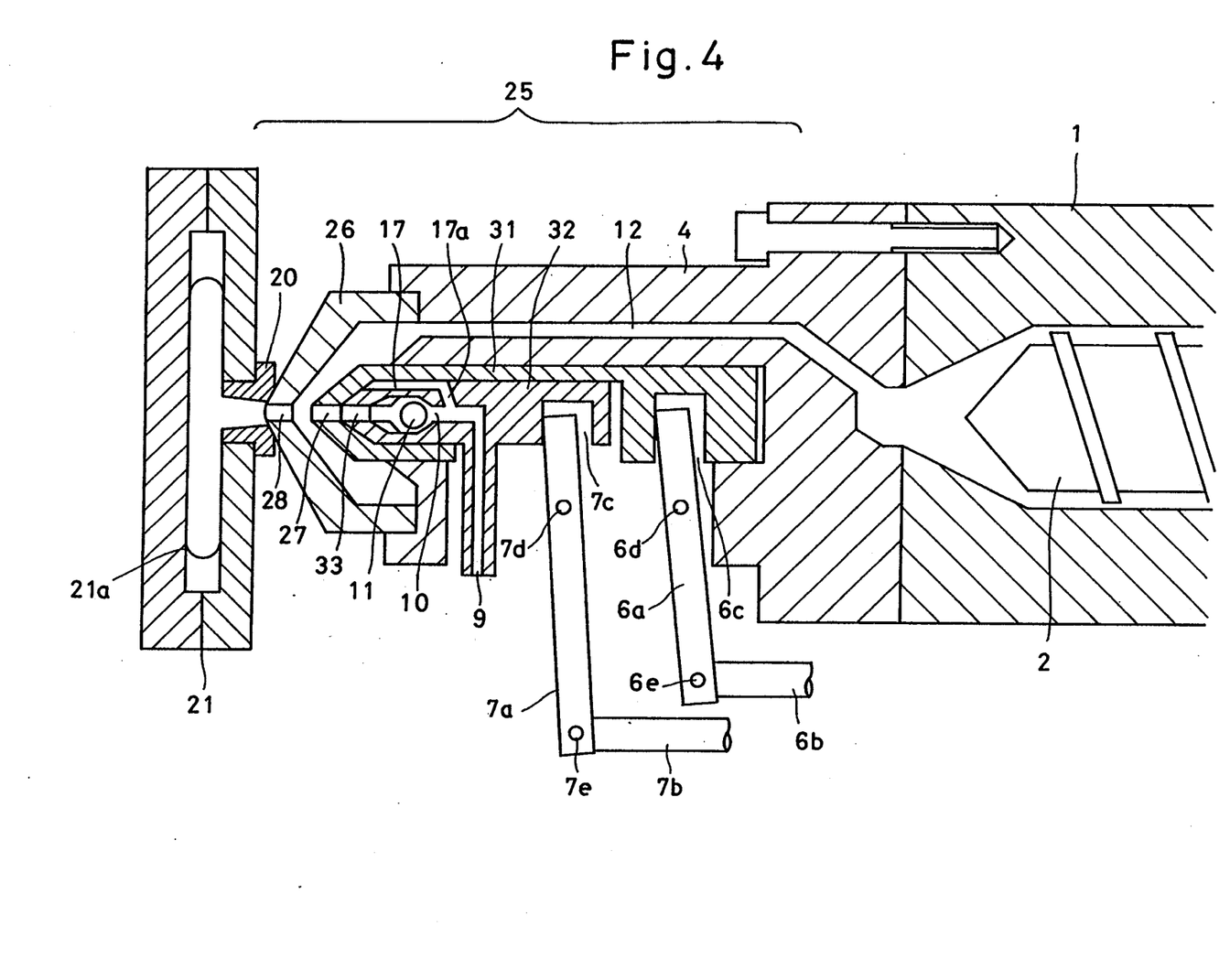
FIG. 4 is a cross section illustrating the third example.

(A) Step of Injection of Molten Synthetic Resin (FIG. 5A):

The advance of the injection cylinder 1 (FIG. 4) pushes the front outer wall of the nozzle body front part 26 of the injection molding nozzle device 25 into pressed contact with the sprue bush 20 (FIG. 4) of the mold 21 (FIG. 4). The retraction of the operating valve 31 with the front outer wall of the needle valve 32 kept in pressed contact with the front inner wall separates the front inner wall of the nozzle body front part 26 from the front outer wall of the operating valve 31 and consequently opens the resin passage 12. The advance of the screw 2 (FIG. 4) of the injection cylinder 1 causes the molten synthetic resin to be injected in a metered amount into the mold cavity 21a (FIG. 4) via the resin passage 12, the nozzle body opening 28, and the sprue bush 20. At this time, the check valve 11 prevents the molten synthetic resin from flowing back into the fluid passage 10 and the backflow of the molten synthetic resin into the fluid discharge passage 17 is prevented because the fluid discharge passage 17 is shut.

Figure 5B:
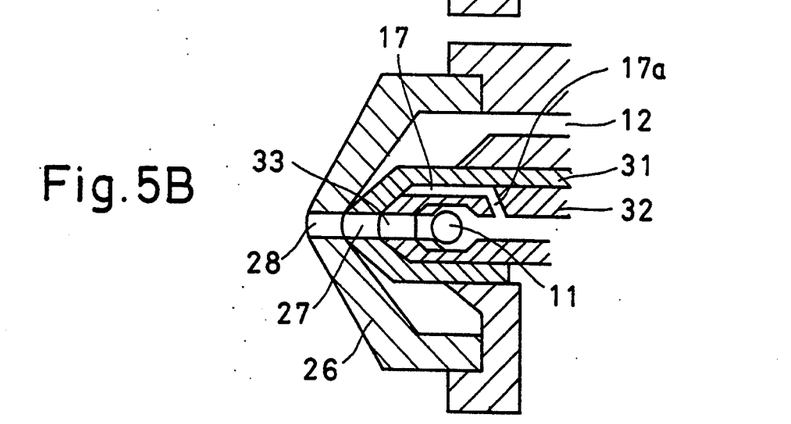

(B) Step of Injection of Compressed Fluid (FIG. 5B)

After the injection of the molten synthetic resin is completed, the operating valve 31 is advanced with the needle valve 32 in a mutually pressed state, the resin passage 12 is kept shut with respect to the entrance of the nozzle proper opening 28 and compressed fluid is supplied from the compressed fluid source. The compressed fluid is advanced through the compressed fluid passage 9, passed through the fluid passage 10, the check valve 11, the needle valve opening 33, the operating valve opening 27, and the nozzle body opening 28. The compressed fluid is injected via the sprue bush 20 of the mold 21 into the central part of the molten synthetic resin now held in the mold cavity 21a of the mold 21, or into the central part of the portion of the molten synthetic resin having an increased thickness, and consequently enabled to form a hollow part therein. At the same time, the synthetic resin encompassing the hollow part is pressed against the inner wall of the mold cavity 21a.

Figure 5C:
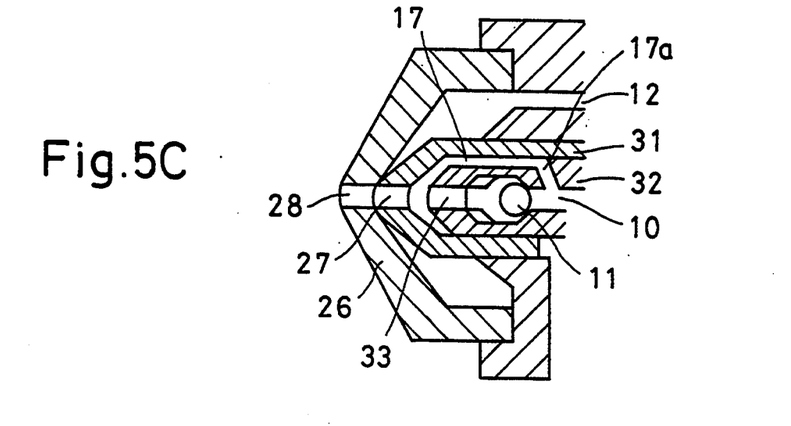

(C) Step of Discharging Compressed Fluid (FIG. 5C)

After the hollow part is formed, the supply of the compressed fluid from the compressed fluid source is stopped. Immediately thereafter or after the elapse of a stated time, the needle valve 32 is retracted with the operating valve 31 kept at the advanced position to relieve the pressed contact between the front inner wall of the operating valve 31 and the front outer wall of the needle valve 32. The fluid passage 10 of the injection molding nozzle device 25 is kept prevented from backflow of the compressed fluid by the check valve 11. The nozzle body opening 28 is consequently allowed to communicate with the fluid passage 10 via the operating valve opening 27 and the fluid discharge passage 17. The needle valve 32 is circumvented by passage 17 and the connecting path 17a. During this time, the fluid passage 10 is opened via the compressed fluid passage 9 into the ambient air or connected to the low pressure container (not shown). The retraction of the needle valve 32 causes the compressed fluid injected into the mold cavity 21a to flow back into the fluid discharge passage 17, and the pressure of the compressed fluid in the mold cavity 21a begins to fall. The discharged compressed fluid is either released into the ambient air or recovered for reuse.

When the pressure of the compressed fluid injected into the mold cavity 21a is lowered to a fixed level. The pressure of the fluid inside the mold cavity 21a can be retained at the fixed level by again advancing the needle valve 32. In this case, after the synthetic resin injected into the mold cavity 21a solidifies the needle valve 32 is again retracted to open the fluid discharge passage 17 and allow the residual compressed fluid to be released into the ambient air or to be recovered. Otherwise, the injection cylinder 1 is retracted to relieve the pressed contact between the sprue bush 20 of the mold 21 and the nozzle body front part 26 and effect release of the residual pressure of the fluid in the mold cavity 21a into the ambient air.

Then, the mold 21 is opened and the movable segment of the mold 21 is separated from the stationary segment to allow removal of the solidified shaped article.

The plasticization and metering of the synthetic resin in preparation for the next step of molding are carried out while the molten resin injected into the mold 21 is being cooled. This occurs after the injection of the molten synthetic resin is completed and the operating valve 31 of the injection molding nozzle device 25 is advanced.

EXAMPLE 4

Figure 6:
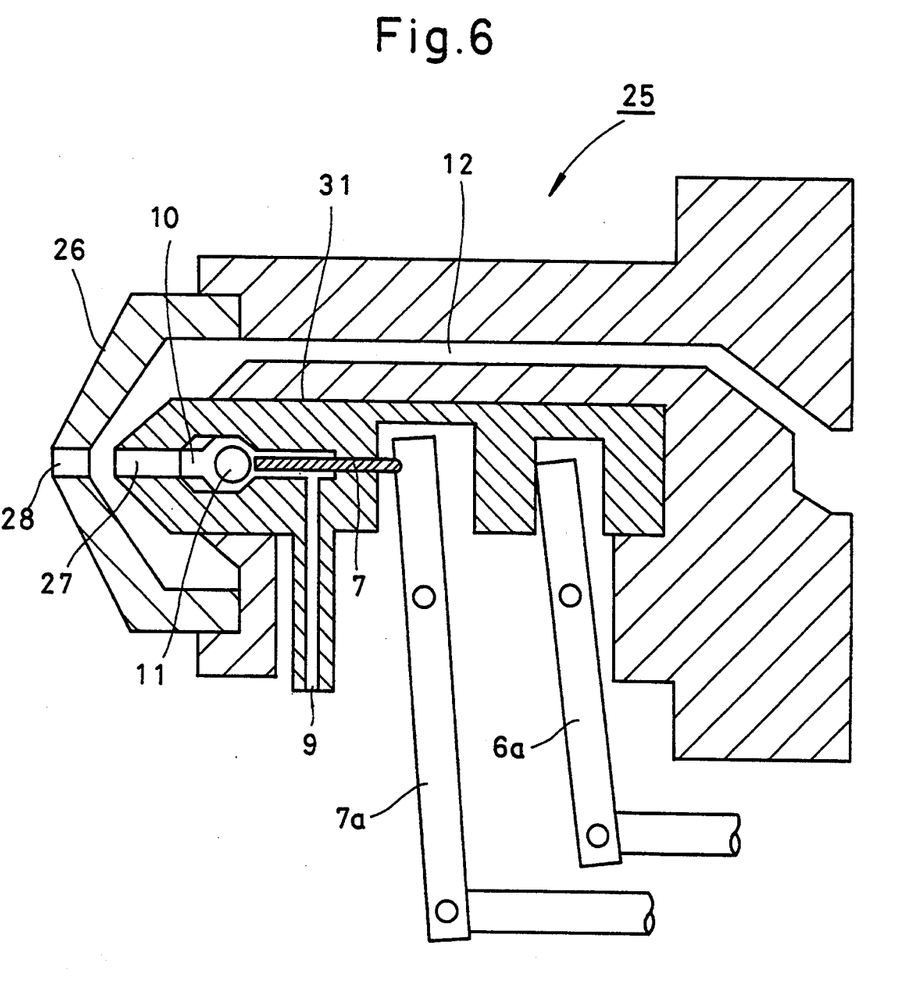
FIG. 6 is a cross section illustrating the fourth example.

Now, the fourth example of the present invention will be described hereinbelow with reference to FIG. 6.

The injection molding nozzle device 25 of this example is composed of the nozzle body 4, the nozzle body front part 26, and the operating valve 31. The nozzle body 4, as in the third example, is attached to the injection cylinder (not shown) and is provided with the resin passage 12 of the same construction as that of the third example.

The operating valve 31 is disposed movably in both ways in the longitudinal direction inside the nozzle body 4. As with the operating valve 31 of the third example, this operating valve 31 is reciprocated to open or shut the resin passage 12. Further, this operating valve 31 is provided in the central part thereof with the fluid passage 10 communicating via the check valve 11 with the operating valve opening 27 at the front part.

During the injection of the molten synthetic resin, the check valve 11 is kept shut lest the molten synthetic resin should find its way into the fluid passage 10 and the compressed fluid passage 9 (providing that for the purpose of effecting injection of the compressed fluid during the injection of the molten synthetic resin, the check valve 11 may be opened by adjusting the pressure of the compressed fluid at a level above the pressure of the molten synthetic resin). During injection of the compressed fluid, the check value is kept open by the action of the pressure of the compressed fluid. The check valve 11 is further provided with a check valve releasing pin 7. Preparatory to the discharge of the compressed fluid from within the mold cavity, the check valve releasing pin 7 is advanced to press the backflow preventing ball of the check valve 11 forward to open the check valve 11. Levers 6a, 7a, are installed for the purpose of reciprocating the operating valve 31 and the check valve releasing pin 7.

Now, the operation of the injection molding nozzle device 25 of the present example will be described below.

(A) Step of Injecting Molten Synthetic Resin

The resin passage 12 is opened by moving the nozzle body 4 into pressed contact with the mold (not shown), retracting the operating valve 31, and separating the front part of the operating valve 31 from the inner wall of the nozzle body front part 26. The advance of the screw (not shown) enables the molten synthetic resin to be injected in a preliminarily metered amount into the mold cavity (not shown) via the resin passage 12 and the nozzle body opening 28.

After injection is completed, the operating valve 31 is advanced to close the resin passage 12.

(B) Step of Injection of Compressed Fluid

The switch valve (not shown) interposed between the compressed fluid source (not shown) and the compressed fluid passage 9 is opened to supply the compressed fluid to the fluid passage 10 via the compressed fluid passage 9 and thence inject it into the mold cavity (not shown) via the check valve 11, the operating valve opening 27 and the nozzle body opening 28.

After a stated time. The switch valve (not shown) is shut to stop the supply of the compressed fluid. The compressed fluid thus injected is retained between the check valve 11 of the fluid passage 10 and the hollow part formed in the synthetic resin held inside the mold cavity.

The injection of the compressed fluid may be started during the injection of the molten synthetic resin, at the same time that the injection is completed, or after the elapse of a stated time following the completion of the injection. The injection of the compressed fluid during the injection of the molen synthetic resin is carried out while the operating valve 31 is kept at its retracted position with the resin passage 12 in an open state, and the pressure of the compresed fluid remains at a level above the pressure of the molten synthetic resin.

(C) Step of Discharging Compressed Fluid

After the synthetic resin is cooled and solidified in the mold cavity (not shown), the check valve releasing pin 7 is advanced to press the backflow preventing ball of the check valve 11 in the fluid passage 10 forward to open the check valve 11. As a result, the compressed fluid in the hollow part formed in the synthetic resin inside the mold cavity (not shown) is passed through the nozzle body opening 28 and the operating valve opening 27 and discharged through the compressed fluid passage 9 via the fluid passage 10.

For the purpose of discharging a part of the injected compressed fluid during the retention of the compressed fluid and consequently allowing the pressure of compressed fluid in the mold cavity to be lowered to a set level and kept at this level, prior to the discharge of the compressed fluid the check valve release pin 7 is advanced and retracted after the stated time.

EXAMPLE 5

Figure 7:
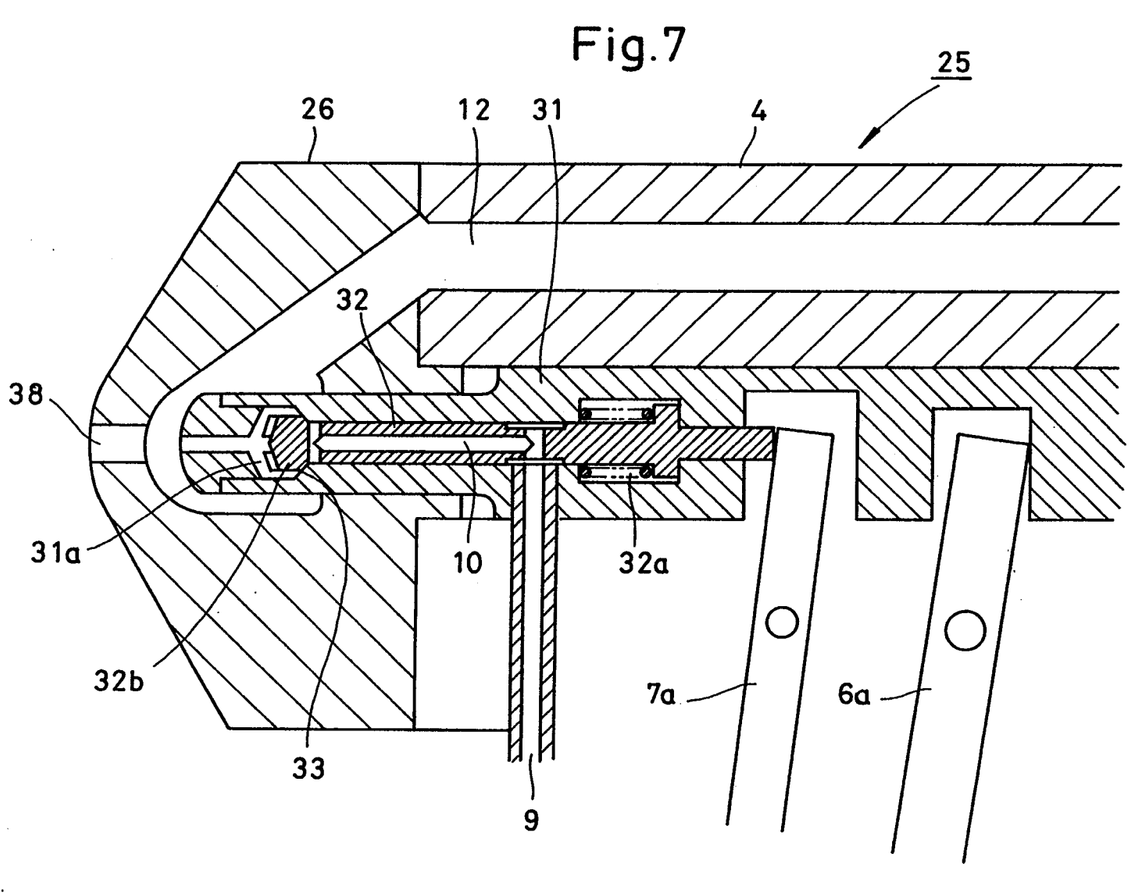
FIG. 7 is a cross section illustrating the fifth example.

Now, the fifth example of this invention will be described herein below with reference to FIG. 7.

The injection molding nozzle body 25 of this example is composed of the nozzle body 4, the nozzle body front part 26, and the operating valve 31. The nozzle body 4 as with the preceding example, is attached to the injection cylinder (not shown) and is provided with the resin passage 12 of the same construction as that of the preceding example.

The operating valve 31 is disposed movably in both ways in the longitudinal direction inside the nozzle body 4. It is reciprocated to open or shut the resin passage 12 in the same manner as in the preceding example. The operating valve 31 is provided in the central part thereof with the needle valve 32 furnished in the central part thereof with the flow passage 10 and adapted to be moved in both ways in the longitudinal direction. Further, the needle valve 32 is provided in the front part thereof with a check valve element 32b disposed integrally with the needle valve 32. The check valve element 32b is provided in the front part thereof with a plurality of radially spaced projections. Paths are formed as interposed between these projections. In consequence of the reciprocation of the needle valve 32, the check valve element 32b is opened or shut as it makes or relieves the pressed contact with a valve seat 33 between the fluid passage 10 and the fluid passage 31a on the inner wall part of the operating valve 31.

The needle valve 32 is provided in the rear part thereof with a spring 32a which is adapted to press the needle valve 32 backward. For the purpose of imparting a forward motion to the needle valve 32, the rear part of the needle valve 32 is kept in contact with the drive lever 7a.

For the purpose of reciprocating the operating valve 31 and the needle valve 32, they are provided respectively with the drive levers 6a, 7a.

Now, the operation of the nozzle device of the present example will be described hereinbelow.

(A) Step of Injecting Molten Synthetic Resin

The nozzle body 4 is set into pressed contact with the mold (not shown) and the operating valve 31 is retracted to separate the front part of the operating valve 31 from the inner wall of the nozzle body front part 26 to open the resin passage 12. The advance of the screw (not shown) causes the molten synthetic resin to be passed in a metered amount beforehand through the resin passage 12 and injected via the nozzle body opening 28 into the mold cavity (not shown). At this time, the cheek valve element 32b is pressed by the spring 32a against the valve seat 33 and consequently enabled to prevent the molten synthetic resin from finding its way into the fluid passage 10.

After injection is completed, the operating valve 31 is advanced to shut the resin passage 12.

(B) Step of Injecting Compressed Fluid

The switch valve (not shown) interposed between the compressed fluid source (not shown) and the compressed fluid passage 9 is opened to supply the compressed fluid via the compressed fluid passage 9 to the fluid passage 10. At the same time, the needle valve 32 is advanced by pushing the rear part of the needle valve 32 forward to open the check valve element 32b and induce injection of the compressed fluid into the mold cavity (not shown) via the fluid passage 31a of the operating valve 31 and the nozzle body opening 28.

After a stated time, the switch valve (not shown) is shut to stop the supply of the compressed fluid. At the same time, the rear part of the needle valve 32 is relieved of pressure so that the needle valve 32 is retracted and the check valve element 32b is shut by the resilient force of the spring 32a.

The injected compressed fluid is retained between the check valve element 32b and the hollow part formed in the synthetic resin held inside the mold cavity.

The injection of the compressed fluid may be started during the injection of the molten synthetic resin, at the same time that the injection is completed, or after a stated time following injection completion. The injection of the fluid during the injection of the molten synthetic resin is carried out by adjusting the pressure of the fluid at a level higher than the pressure of the molten synthetic resin while the operating valve 31 is kept in its retracted position, the resin passage 12 in its open state, and the needle valve 32 in its advanced state.

(C) Step of Discharging Compressed Fluid

After the synthetic resin in the mold cavity (not shown) is cooled and solidified, the check valve element 32b is opened by pressing the rear part of the needle valve 32 again forwardly and advancing the needle valve 32. As a result, the compressed fluid entrapped in the hollow part formed in the synthetic resin is passed through the nozzle body opening 28 and the fluid passage 31a and discharged out of the compressed fluid passage 9 via the fluid passage 10.

For the purpose of discharging a part of the injected compressed fluid during the retention of the compressed fluid and consequently allowing the pressure of compressed fluid in the mold cavity to be lowered to a set level and kept at this level, prior to the discharge of the compressed fluid the operation of advancing the needle valve 32 and retracting it after the stated time may be additionally performed.

As described above, the injection molding nozzle device of this invention has the following effect.

By injecting the compressed fluid simultaneously during the injection of the molten synthetic resin or after the injection of the molten synthetic resin, the hollow part of the molten synthetic resin is formed. The fluid discharge passage or the check valve is opened for a predetermined time. In this manner a certain amount of the compressed fluid entrapped in the hollow part of the synthetic resin flows out. Consequently, it is rendered possible to control the retained pressure of the compressed fluid in the hollow part formed at the central part of the synthetic resin within the mold cavity at a preset level. Further, since the check valve can be formed at a desired position in the fluid passage, the length of the fluid passage on the front side of the check valve can be shortened and, at the same time, this fluid passage can be formed in a straight substantially path. The clogging of the fluid passage with the synthetic resin is easily prevented. The possible backflow of the molten synthetic resin into the fluid passage is prevented, and the recovery of the compressed fluid is carried out quickly and smoothly.

The unduly large residual strain developed in the synthetic resin layer enveloping the hollow part can be alleviated and the defects in quality of the product such as micro-crazing, blushing, crazing, and swelling of the surface layer of the shaped article enveloping the hollow part can be eliminated by controlling the pressure of the compressed fluid retained in the hollow part formed at the central part of the synthetic resin inside the aforementioned mold cavity.

The pressure of the fluid in the hollow part can be controlled by injecting the molten synthetic resin and the compressed fluid into the mold cavity and thereafter, permitting gradual back flow. The possiblity that the synthetic resin enveloping the hollow part will be cooled and solidified under an unduly large fluid pressure can be precluded. The time required for the pressure of the fluid in the hollow part to be lowered to atmospheric pressure before the mold is opened and the shaped article is removed from the mold can be decreased. And, the molding cycle can be shortened. These can all be accomplished by gradually lowering the pressure of the fluid in the hollow part to atmospheric pressure in concert with the advance of the cooling of the molten synthetic resin in the mold cavity.

Further, by retracting the screw after injection of the molten synthetic resin and causing the compressed volume of the injected molten synthetic resin to flow back (suck back) to the cylinder side, the pressure of the molten synthetic resin at the injection inlet of the mold can be lowered and the injection of the compressed fluid can be effecively performed at a lower pressure.

What is claimed is:

1. An injection molding nozzle device for use with a mold having an injection inlet, comprising:
    a resin passage intercommunicating a nozzle body opening of a nozzle body front part and an injection cylinder, wherein the peripheral part of said nozzle body opening and the peripheral part of the injection inlet of said mold are configured to permit direct mutual pressed contact;
    an operating valve installed movably in an axial direction inside said nozzle body and provided with an operating valve opening at a position substantially coinciding with said nozzle body opening, and driving means for moving said operating valve in the axial direction;
    a gas passage formed in said operating valve and communicating via a check valve to said operating valve opening;
    a head part having a front part slidably mounted to the outer side of said nozzle body front part and movable a predetermined stroke distance in the axial direction relative to said nozzle body front part;
    a head part opening formed at the front part of the head part and defined by an inner peripheral surface which is parallel to the axial direction relative to said nozzle body front part said head part opening having a larger diameter than said injection inlet and being sized to receive a forward-most portion of said nozzle body front part, said forward-most portion of said nozzle body front part having an outer peripheral surface which slides along the inner peripheral surface of said head part opening for substantially the entire stroke distance as said head part moves in the axial direction relative to said nozzle body front part, the peripheral part of said head part opening and the outside of the peripheral part of the injection inlet, which contacts with the peripheral part of said nozzle body opening, are configured to permit direct mutual pressed contact;
    a gap defined by said inner peripheral surface of the head part opening, said forward-most portion of the nozzle body front part and said peripheral part of the injection inlet of said mold;
    a gas discharge passage communicated with said gap to remove gas from said gap;
    a compressed spring positioned between said head part and said nozzle body for resiliently pressing said head part toward the mold; and
    gas discharge open-shut means for selectively opening and shutting the communication between said gap and the injection inlet of said mold by the breakage of the pressed contact between said peripheral part of said nozzle body opening and the peripheral part of the injection inlet of said mold.

2. The injection molding nozzle device according to claim 1, wherein said gas discharge passage extends through said nozzle body front part.

3. The injection molding nozzle device according to claim 1, wherein said gas discharge passage extends through said head part.

* * * * *

UNITED STATES PATENT AND TRADEMARK OFFICE
CERTIFICATE OF CORRECTION

PATENT NO. : 5,374,181
DATED : December 20, 1994
INVENTOR(S) : Horikoshi et al.

It is certified that error appears in the above-identified patent and that said Letters Patent is hereby corrected as shown below:

Claim 1, Column 16, Line 18, after "part" (first occurance) insert a comma --,-- .

Signed and Sealed this

Twenty-first Day of February, 1995

Attest:

BRUCE LEHMAN

Attesting Officer    Commissioner of Patents and Trademarks